US011161186B2

United States Patent
Herrington

(10) Patent No.: US 11,161,186 B2
(45) Date of Patent: Nov. 2, 2021

(54) SHALE SHAKER MOTOR MOUNTING PLATE MILLING MACHINE

(71) Applicant: Brett Herrington, Cleveland, TX (US)

(72) Inventor: Brett Herrington, Cleveland, TX (US)

( * ) Notice: Subject to any disclaimer, the term of this patent is extended or adjusted under 35 U.S.C. 154(b) by 97 days.

(21) Appl. No.: 16/593,424

(22) Filed: Oct. 4, 2019

(65) Prior Publication Data

US 2020/0361009 A1 Nov. 19, 2020

Related U.S. Application Data

(60) Provisional application No. 62/735,757, filed on Sep. 24, 2018.

(51) Int. Cl.
*B23C 3/13* (2006.01)
*E21B 21/06* (2006.01)

(52) U.S. Cl.
CPC ............ *B23C 3/13* (2013.01); *B23C 2255/08* (2013.01); *E21B 21/065* (2013.01)

(58) Field of Classification Search
CPC .. B23Q 9/0007; B23Q 9/0014; B23Q 9/0028; B23Q 9/0042; B23Q 9/02; B23C 1/002; B23C 1/007; B23C 1/02; B23C 1/14; B23C 1/20; B23C 2255/08; B23C 3/13; E21B 21/065; E21B 43/35
See application file for complete search history.

(56) References Cited

U.S. PATENT DOCUMENTS

| | | | | | |
|---|---|---|---|---|---|
| 1,714,213 | A | * | 5/1929 | Claybourn | B23C 3/13 29/33 H |
| 3,910,159 | A | * | 10/1975 | Gladwin | B23Q 1/48 409/199 |
| 4,022,106 | A | * | 5/1977 | Kile | B23C 1/20 409/178 |
| 4,777,707 | A | * | 10/1988 | Kirscher | B23C 7/00 29/33 R |
| 5,106,243 | A | * | 4/1992 | Hunt | B23C 1/20 144/24.05 |
| 2003/0207742 | A1 | * | 11/2003 | Hazlehurst | B64F 5/10 483/36 |
| 2010/0031487 | A1 | * | 2/2010 | Messina | B23K 37/0408 29/26 A |
| 2017/0057031 | A1 | * | 3/2017 | Li | B23Q 9/0042 |
| 2018/0050430 | A1 | * | 2/2018 | Ashworth | B23Q 1/621 |
| 2018/0169768 | A1 | * | 6/2018 | Albert | B64F 5/10 |

FOREIGN PATENT DOCUMENTS

| | | | | | |
|---|---|---|---|---|---|
| FR | 1459218 | A | * | 4/1966 | ............. B24B 7/224 |
| GB | 551514 | A | * | 2/1943 | ........... B23Q 9/0014 |

* cited by examiner

*Primary Examiner* — Nicole N Ramos
(74) *Attorney, Agent, or Firm* — Kearney, McWilliams & Davis, PLLC; William Yarbrough

(57) ABSTRACT

The present invention is directed to a device that is removably secured to the exterior surface of a motor mounting plate to allow for milling of the mounting plate both in the field and off site. The adjustable attachment, positioning and securing frame of the device supports an operating frame that houses a travel mechanism and a cutting mechanism wherein a cutting tool attached to a cutting mechanism travels along a predetermined path, along and across the face of the motor mount plate, milling the surface of the motor mount plate true and flat.

19 Claims, 5 Drawing Sheets

SHALE SHAKER MOTOR MOUNTING PLATE MILLING MACHINE

FIELD OF THE INVENTION

The present invention, generally, is directed toward a mountable and dismountable device designed for the "milling" or machining of exteriorly facing worn components (i.e. motor mounting plates) on a shale shaker used in oil and gas exploration, production and mining. More specifically, the present invention relates to a mountably removable and adjustable device which clamps, bolts, pins or otherwise connects to a shale shaker motor mounting plate used in refurbishing and repairing of primary worn areas of a shale shaker after vibration, together with resultant friction, have caused such areas to wear over time.

BACKGROUND

Shale shakers are an essential tool in oil and gas drilling exploration in addition to procurement devices used for varied purposes in the fields of mining and recycling. In essence, shale shakers are crucial for separating desired solids from undesired solids, in the case of mining, and for separating desired fluids from undesired particles, in the case of oil and gas production. In the petroleum industry, and most important to the present invention, shale shakers are the first (physical) phase of a solid material controls and solids removal systems both for terrestrial and off shore drilling rigs. Shale shakers are utilized specifically for the removal of large, coarse solids ("cuttings") from the drilling fluid ("mud") before recycling and reusing the fluid. Evidenced in several variations, including linear motion shale shakers, circular motion shale shakers and balanced elliptical motion shale shakers, the shale shakers themselves serve as the first line of separation of solid particles from a liquid medium (e.g. "cuttings" and debris from drilling fluid or drilling "mud") for fluid recovery for reuse and reintroduction into the wellbore.

Operationally in oil and gas drilling, drilling fluids are central to the drilling process and serve the primary functions of (1) providing positive, hydrostatic pressure within the well, (2) maintaining the integrity of the well, (3) lubricating and cooling the drill bit, (4) maintaining a clear and clean drill bit and (5) suspending and conveying drilled cuttings up and out of the borehole and to the formation surface—the latter being the most pertinent to the use and usefulness of the shale shaker. The fluids themselves can be a mixture of various chemicals in liquid form (e.g. a water-based solutions, oil-based solutions, or synthetic based solutions) and may constitute a combination of caustic and costly chemicals. For both environmental reasons and budgetary concerns, drilling fluid loss is remedied by separating the recovered drilling fluid away from the retrieved drilled cuttings thereby allowing for the recovery of a majority of the fluid before recycling and reusing the drilling fluid in a given system. The removal of solids on the first circulation from the well is imperative, before any subsequent mud reintroduction into the well, as smaller drilling solids can be reintroduced into the well with recycled drilling fluids and these small particles carry the potential of detrimentally affecting the functioning of a drill bit (and related drilling equipment) and may adversely affect well integrity, rig productivity, and worker safety.

Concisely, it can be posited that the shale shaker itself can be reduced to 2 functionalities—vibration and filtration. In operation, after introduction of drilling fluid into the well, drilling fluids or "mud" are ultimately returned to the surface and used or spent drilling fluid (with accompanying particulates) flowing directly into the basket of shale shakers where it is then processed. After the drilling fluid is introduced into the shale shaker beds, vibration is used to separate solid particles from the drilling fluid through a high velocity agitation in the form of intense vibration. The vibration of the basket physically facilitates the separation of solids from liquid drilling fluid which is further filtered through a filamentous basket "sieve" (i.e. screens) that allow for passage of fluids while retaining unwanted solids upon its surface. Once the solids are separated from the drilling fluid, the drilling fluid is further processed by the shale shaker basket filter screens where desired drilling fluid is segregated from used drilling mud and deposited into large "mud tanks"—where additional solids control equipment subsequently completes the process of removing ever finer solids from the drilling fluid. The solids removed by the shale shaker are guided out of a discharge port and into a segregated holding tank where the solid particles may undergo further treatment for eventual disposal. The drilling fluid, then, once cleared of solid particles, is then reprocessed and reused in the removal of additional cuttings during the drilling process.

Thus, with regards to the cleanliness of the drilling fluid, the effectiveness of shale shakers in maintaining the purity of the drilling fluid through solid material removal is directly related to shale shakers ability to successfully and efficiently separate the drilling fluid from solid materials. Moreover, it is the enhanced efficacy of the shale shaker, through proper maintenance and functioning, that will lead to better functioning oil field equipment, as evidenced by efficient fluid recapture and limited downtime, with an overall net cost savings through increased fluid capture proficiency.

Operationally and structurally, shale shakers consist of the hopper, the feeder, the basket (or baskets) and various mechanical means of vibrating the bed (deck/flat), mechanically via vibratory motors, and means to shift the angle of the basket in an effort to sort solid materials away from drilling fluids in the most productive manner. The hopper, also known as the "base", serves as both a platform for the shaker and collection pan for the fluid processed by the shaker screens. The feeder is essentially a collection pan for the drilling fluid before it is processed by the shaker. The drilling fluid enters the feeder and fills the feeder to a predetermined point whereby the drilling fluid spills over the feeder and onto the screening area of the shaker. It can therefore be seen that the screen basket or "bed" and vibratory motor make up the two most significant functioning parts of the shale shaker, as they are responsible for (1) filtration and (2) generating and transferring the shaking intensity of the machine, measured in multiples of "G's" or a measure of acceleration due to gravity, while distributing the "shaking" vibratory motion uniformly across the entire basket, respectively. Each of the two interrelated components, therefore, are integral to the functioning of a shale shaker in that the shaker motor must: (1) transfer energy to the screen basket for agitation, facilitating removal of drilled solids from the drilling fluid, and (2) effectively move the separated particles out of the shale shaker system. While the motor-energized shale shaker basket distributes received vibration across its entire surface (most efficiently using the total screen area for liberation of solid particles from drilling fluid and causing said drilling fluid to separate from solids through receptively porous screens), shale shaker basket screens allow for efficacious mud collection while providing a largely linear platform for the advancement of collected particles out of the separation system.

Different shale shakers have different means by which the demands of solid separation are accomplished by using particular screen tensioning apparatuses, specifically designed seals around the screens, basket reinforcement to increase basket integrity, special float mounts together with rubber deck seals and selective vibrator(s) placement and varying high and low intensity speeds. In addition to vibration, the shaker basket must be capable of shifting its angle and position (proportional to the flow rate of the drilling fluid) to accommodate various flow rates of drilling fluids and to maximize the entire area of the shaker bed via an angling mechanism (be it mechanical, pneumatic or hydraulic). The drilling fluid flowing over the shaker bed is maintained, primarily, in two states—the pool and the beach. The pool is the area of the screening deck that consists mostly of drilling fluid with drilled cuttings suspended within it, while the beach is the area where the drilling fluid has been mostly removed from the cuttings and areas of solids are ultimately formed. A ratio of pool to beach is generally maintained at approximately 20:80, respectively, depending on the requirements of cutting dryness and flow rates. In essence, the wire and cloth mesh of screens act as a large "strainer", with the mechanically created vibration acting as the driving force that receives and filters the drilling fluid through the mesh to accepting "mud tanks" below for subsequent additional processing. The aforementioned angling mechanisms can be utilized to not only maximize the drilling fluid recovery, but also to employ the entirety of the shaker bed, in conjunction with the vibratory force (defined through amplitude and stroke, vibratory motion and vibratory speed) of the vibrator mechanism, to create a linear, unbalanced elliptical and/or circular motion reinforced by an intense shaking of the basket to gain the full range of use of the shaker basket surface area thereby increasing shale shaker efficacy.

Yet, of particular importance to the present invention, is the point of communication between the shale shaker frame and the vibrating motor—namely the shale shaker motor mount plate (consisting of an angled surface which is made to exhibit a corresponding point of attachment for an attached motor mechanism). While the shale shaker and accepting shale shaker basket are subject to intense vibratory forces in terms of extreme oscillating energy (in order to optimize fluid flow-through while allowing contact to the maximum accessible surface area), it is the motor mounting plate (consisting primarily of an angled, front-facing and flat receiving surface) that represents the point of the greatest degree of received friction, and thus wear, both directly affecting the maintenance of materials integrity and durability and overall serviceable life-span of the shale shaker. In use, it is evident that over time and continued use, wear at this point of connection is inevitable and will ultimately require remediation or replacement, each at increasing incurred maintenance or replacement costs.

Typically, motor mounts are designed to be integrated into the shale shaker frame and set at such an angle as the accept a vibrating motor, typically a three-phase induction AC electric motor, that is explosion proof and generally consist of two magnetic poles (3600 rpm synchronous shaft speed at 60 Hz), four magnetic poles (1800 rpm), or six magnetic poles (1200 rpm). Traditionally, motors used in oil and gas fluid and solid separation are integral-horsepower, across-the-line start, or horizontal squirrel-cage motors, across-the-line motors being the simplest and most cost effective. The motors themselves are classified by centrifugal force output, frequency, unbalance (static moment), and horse power where centrifugal force is created by torque resultant from the offset eccentric weight acting through the moment arm (the distance from the shaft center to the center of gravity of the weight) and torque which is expressed as unbalanced or static moment (the unbalance providing for the amplitude of screen movement). Two counter-rotating shale shaker motors will produce a linear force that is ideally located through the center of gravity of the shaker basket where the motion derived from the shale shaker motors runs perpendicular to a plane drawn between the rotating shafts (directed through the center of gravity of the machine). Preferably the shale shaker motor should be chosen to either meet or exceed the requisite stroke of the machine (peak-to-peak displacement imparted to the machine where stoke is a function of the unbalance and total weight of the shale shaker basket including live load), centrifugal force (which is equal to the shaft speed squared X the unbalance), and acceleration (g's) required—typically 4 to 8 g's.

The current solution to shaker part wear is to remove the baskets from the drilling rig, transport the baskets to a machine shop and "mill" the motor mounting plates (i.e. remove material from the surface of the mounting plate) on a stationary, shop installed machine. The worn areas of the shale shaker motor mounting plate are then "milled down" by a machining or "grinding" process using rotary cutters or grinding stones or wheels responsible for removing material from a workpiece to depths in the range of 0.001" to 1.00" where the least amount of surface area is removed that both remediates wear while maintaining the integrity of the motor mounting plate or other wear receiving areas.

The present invention utilizes a combination of mounting pad, clamps and adjustment bolts to secure and angle the cutting mechanism in the proper orientation to ensure proper functioning prior to milling. The cutting mechanism is brought into contact with the outer surface of the worn motor mounting plate (or conversely the milled area is advanced toward the securely positioned cutting mechanism) at a rate and depth and in such a direction and angle (relative to the tools cutting element) as to produce reconditioned parts customized to meet extremely precise tolerances of plus or minus 0.001 inch. The feeding or advancement of the cutting mechanism is controlled by a variable speed motor (i.e. travel motor and travel gear combination) that provides guided movement along a precise and predetermined or guided pathway of a mobile carriage (i.e. cutting mechanism housing) that incorporates the primary cutting mechanism. As the travel motor advances the carriage deliberately along a fixed-depth path (via a fixed-path, rotating screw, for example), the carriage system, by attached drive system and cutting mechanism, engage a shale shaker motor mount plate along the outward face of the shale shaker part (e.g. motor mount plate) at an adjustable depth as is determined by the desired removal of plate thickness and area that is required to be incrementally removed.

While advantages of an adjustable and adherable milling device are readily apparent in the extremely precise refurbishing of shale shaker wear components (i.e. motor mount plates), generally, the benefits are increased exponentially when the same device can be used to offer exceedingly accurate and infinitely reproducible remediation advancements at the work site expressly without shale shaker relocation. Ceasing of shale shaker operational use alone incurs cost to the drilling operation regardless of the location of repair or refurbishment due to suspended operations and unproductive downtime. Yet, this loss of operational time and increased operational cost are compounded even further when considering the traditional removal of the entire shale shaker, for the sole purpose of ameliorating worn motor mounting plates, and machining of the worn sections of the motor mounting plate at an offsite facility. Add to this the compounding issues of current non-standardized and retro-fitted machining and milling equipment, the overall variable size of shale shakers and components, the mutable sizes of motor mounting plates, in particular, the angle of various mounting plates, the overall stationary nature of oilfield equipment and an inability to develop a "mobile" and/or attachable and mountable milling machine that can be made to accept any number of shale shaker mounting parts (up to and including motor mounting plates), it becomes clear that it is imperative to take note that it is incumbent upon the oil and gas industry to address such a long standing issue in a manner that is consistent, precise, ergonomic and efficient. The present invention addresses this long-felt need in a non-obvious and novel manner.

It is the above deficiencies that inventor hopes to address with the present device while providing a safe, effective and economical solution to shale shaker component repair and remediation, motor mount plate repair and refurbishment being the primary recipient of these remunerative measures through the use of the device described herein.

SUMMARY OF INVENTION

The present invention solves the aforementioned infirmities by allowing shale shaker motor mount plates to be machined in the field just as easily as an offsite facility. And, while on-site repair and maintenance has obvious advantages to offsite operations in terms of transportation time, the logistics of shale shaker removal from platforms and rigs, loss of production time and increased associated costs, off-site motor mount milling too exhibits patent benefits from a mountable and dismountable milling device that more efficiently, accurately and timely accomplishes the aforementioned milling process via an easily placeable and replaceable device that more effectually achieves motor mount plate milling.

Succinctly, the present invention, as envisioned by inventor, is transitorily mounted to a shale shaker mounting plate and, being specifically designed for attachment to the shaker basket, greatly reduces nonuniform milling, over-milling, set up and break down time and overall machine time. Equally, machining in the field is even further enhanced with the additional advantage of reduced shaker basket and rig downtime, nullifying transportation cost and decreasing overall machining cost through mechanization and uniformity of process. Expressly, milling of the motor mounting plate to a true and uniform pitch aids in the functioning and wearablity of the shale shaker from decreased broken motor bolts, the application of homogeneous vibration across the shale shaker frame and basket and relieving of undo stress on motor bearings (obviating premature bearing failure), among the most prominent, but certainly not all advantages, resulting in an overall proper functioning shale shaker basket.

In sum, the present invention allows for in situ or offsite reconditioning and repair of essential components (e.g. motor mounting plates) of a shale shaker with the final goal of supporting a properly functioning shale shaker basket motor which is ultimately responsible for the vibratory stimulation induced solids control and solids removal from introduced drilling fluids. The present invention cannot only extend the life of the shale shaker, by refurbishing the operational constituents of a shale shaker (e.g. motor mount plates) at the primary point of frictional wear (as well as obviate parts replacement and increase the interval between complete shale shaker replacement), but also the present device can further accomplish repairs without removing the shale shaker from its operative placement thus eliminating the cost of transportation—thereby decreasing overall costs associated with maintenance and repair.

DETAILED DESCRIPTION

Figure 1:
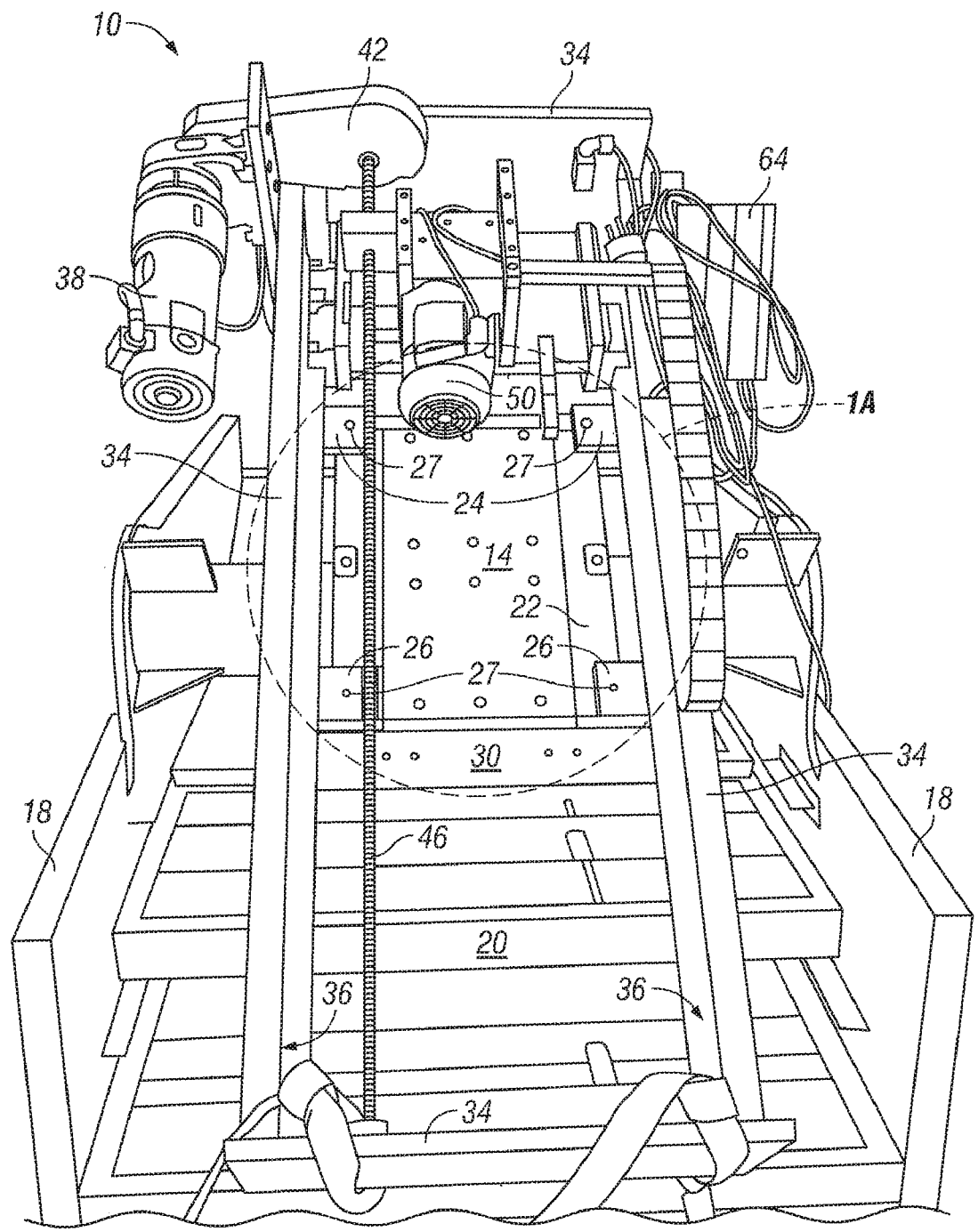
FIG. 1 depicts a front view of a shale shaker motor mounted milling machine that is the present invention.
Figure 1A:
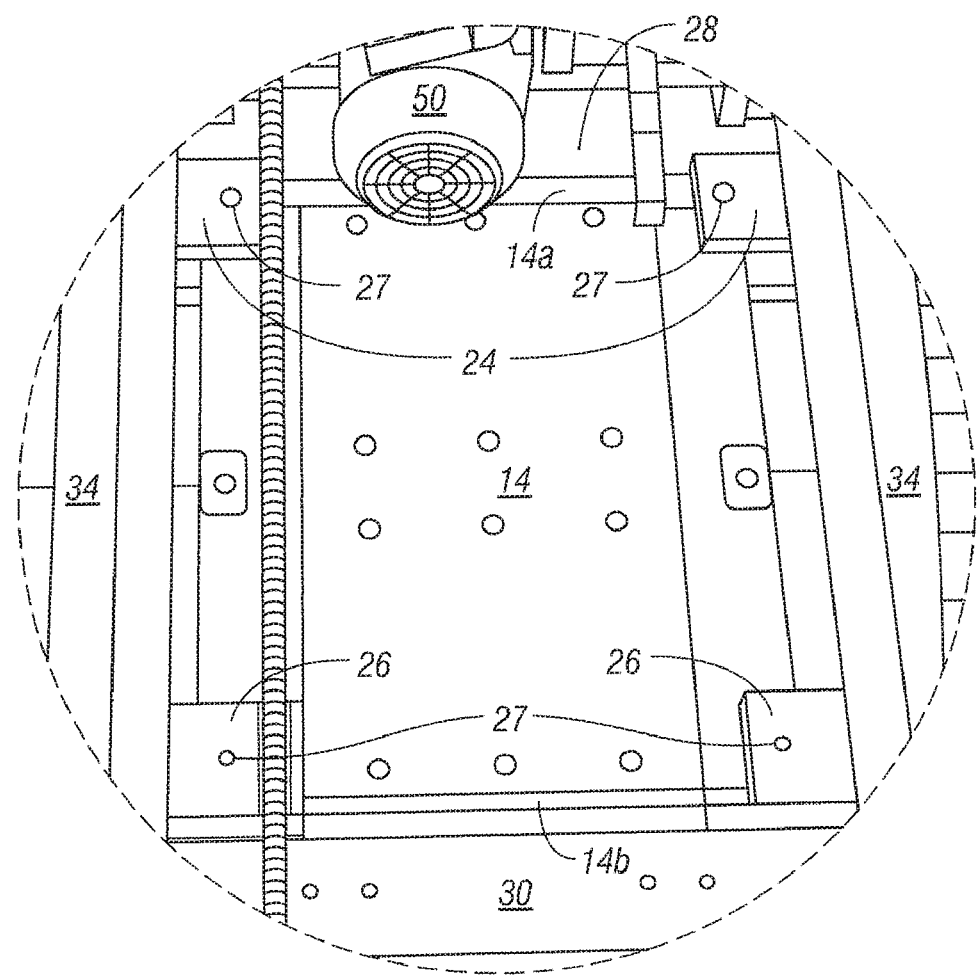
FIG. 1a shows an enlarged portion of the smaller attachment and positioning frame of the present invention.

The following description evidences example embodiments which are not intended to be limiting in scope. References to "the invention", "the present invention", "one embodiment", "another embodiment" and "yet another embodiment" and like representational language is not intended to limit, restrict or otherwise regulate the invention itself to any one exemplary embodiment or any aggregation of several embodiments, unless expressly noted.

Likewise, drawings and representations of the various operable features of the present invention are provided for illustrative purposes only and are not intended to be limiting as to the scope of the invention which is defined by the appended claims and any and all equivalents thereof. And, while specific terms are included within the claims themselves, each term is simply descriptive as to the particular feature being described and are intended to be given their broadest, customary meaning as would be ascribed by those having ordinary skill in the art.

With reference to methods, techniques, sequences, processes and procedures of accomplishing the practical use of the present invention, it is to be understood that the use of the shale shaker motor mounting milling machine is, as well, illustrative and not to be taken in a limiting and restrictive sense so long as it would be apparent to one having skill in the art how the present invention seeks to accomplish motor mount milling. Too, the steps and sequence of accomplishing those steps are equally open to modification and amendable to various arrangements that result in the remediation of warp and wear on the motor mounting plate of a shale shaker.

The following numbers appear in the application diagrams referencing individual features defining the present invention:

REFERENCE NUMBER FEATURE

10 shale shaker motor mounted milling machine
14 motor mounting plate 18 shale shaker
20 shale shaker screen decking
22 adjustable attachment, positioning and securing frame
24 upper indication blocks
26 lower indication blocks
27 leveling adjustment screws
28 upper mounting brackets
30 lower mounting bracket
32 inferior mounting brackets
34 operational frame
36 interior guide track
38 travel motor
42 travel motor gear box
46 travel screw
50 spindle motor
51 tool bar
52 cutting tool
54 spindle motor gear box
56 depth adjustment knob
60 spindle motor carriage
61 cable wire carrier drag chain
62 spindle carriage receiving arm
64 control box And while the above list of features is shown in the Figures, it should be appreciated that all items are not required for functionality and that omissions, modifications and equivalents may be employed without departing from the scope and spirit of the present application.

Attachment and Positioning Frame

The shale shaker motor mounted milling machine 10 that is the present invention consists of a smaller (substantially square) adjustable attachment, positioning and securing "frame" 22 (comprised of upper indication blocks 24, lower indication blocks 26 and upper and lower mounting brackets 28 and 30, respectively, for upper, lower and side edge adherence and securing circumferentially, and inferior mounting brackets 32 disposed rearwardly for inferior adherence and securing) for mounting the present invention 10 to the motor mounting plate 14 of a shale shaker 18 (residing superior to shale shaker screen decking 20). Furthermore, the smaller, adjustable attachment, positioning and securing frame 22 serves the additional function of supporting the larger rectangular operational frame 34 designed to attach, connect or be otherwise affixed to the smaller, adjustable attachment, positioning and securing frame 22 where the larger rectangular operational frame 34 serves to (a) provide an interior guide track for guided spindle carriage advancement and translocation, (b) supports attachment and securing of the present invention's 10 functional elements (i.e., travel motor 38, travel motor gear box 42, travel screw 46, spindle motor 50, tool bar 51, cutting tool 52, spindle motor gear box 54, depth adjustment knob 56, spindle motor carriage 60, cable wire carrier drag chain 61, spindle carriage receiving arm 62 and control box 64) and, as well, (c) provides for precise planar advancement, as well as controllable depths, of the cutting element and supplemental securing of the present invention 10 in relation to the smaller, adjustable attachment, positioning and securing frame 22 to the shale shaker and shale shaker motor mounting plate 14. Operationally, appropriate functioning of the device 10 requires (1) attachment and positioning of the smaller, adjustable attachment, positioning and securing "frame" 22 (comprised of indication blocks 24,26, mounting brackets 28,30 and inferior mounting brackets 32) in conjunction with a correspondingly (2) accurately and precisely positioned and leveled rectangular operational frame 34 wherein each frame, both 22 and 34, ensures required (3) alignment, leveling and positioning of a travel screw 46 in order to (4) properly guide the spindle motor 50, (5) for the operation of a cutting device 52 (via the spindle motor 50 advancement along a predetermined a travel screw 46 path along the travel screw's helical ridge or external thread, for example, to guide the mechanical means of surface milling (the spindle motor 50 and cutting tool 52 combination) across the largely flat, outwardly disposed exterior surface of the motor mounting plate 14.

Figure 3:
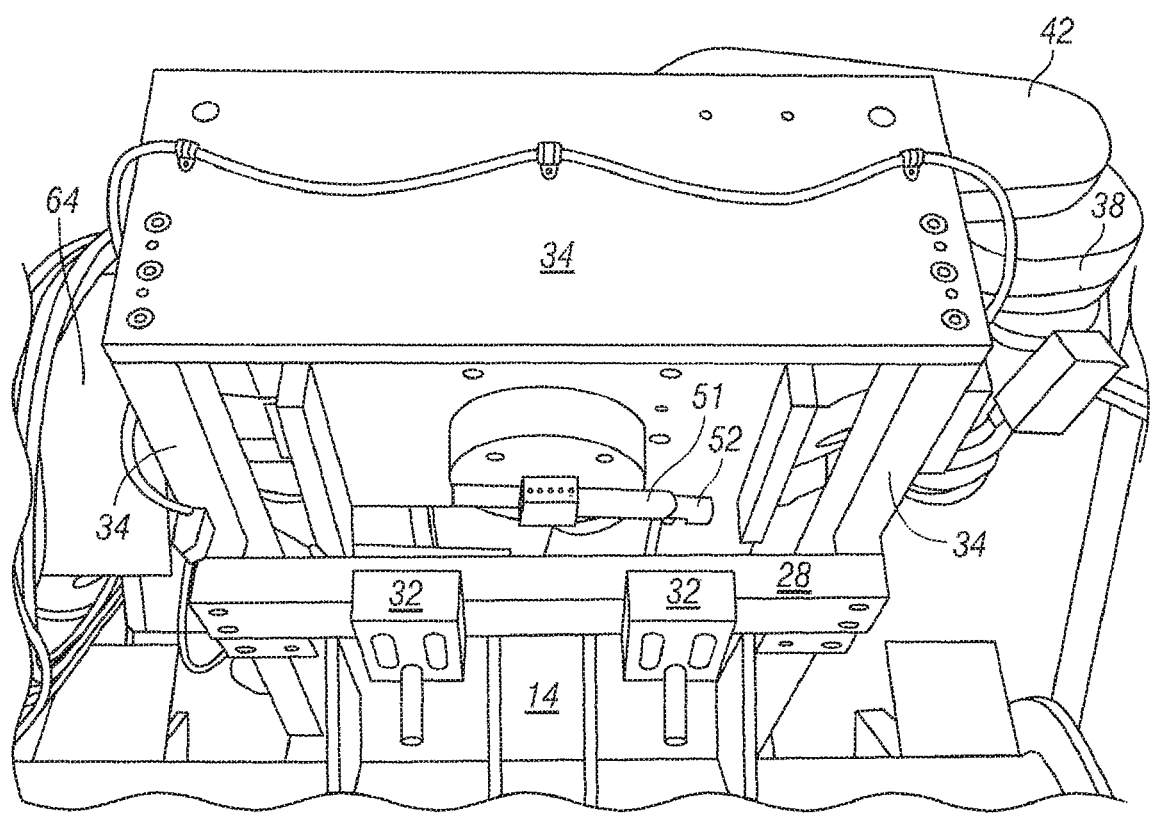
FIG. 3 shows a rear view of rectangular operational frame, adjustable attachment, positioning and securing frame, travel motor and gear box, spindle motor and gear box, spindle carriage and travel screw of the present invention.
Figure 4:
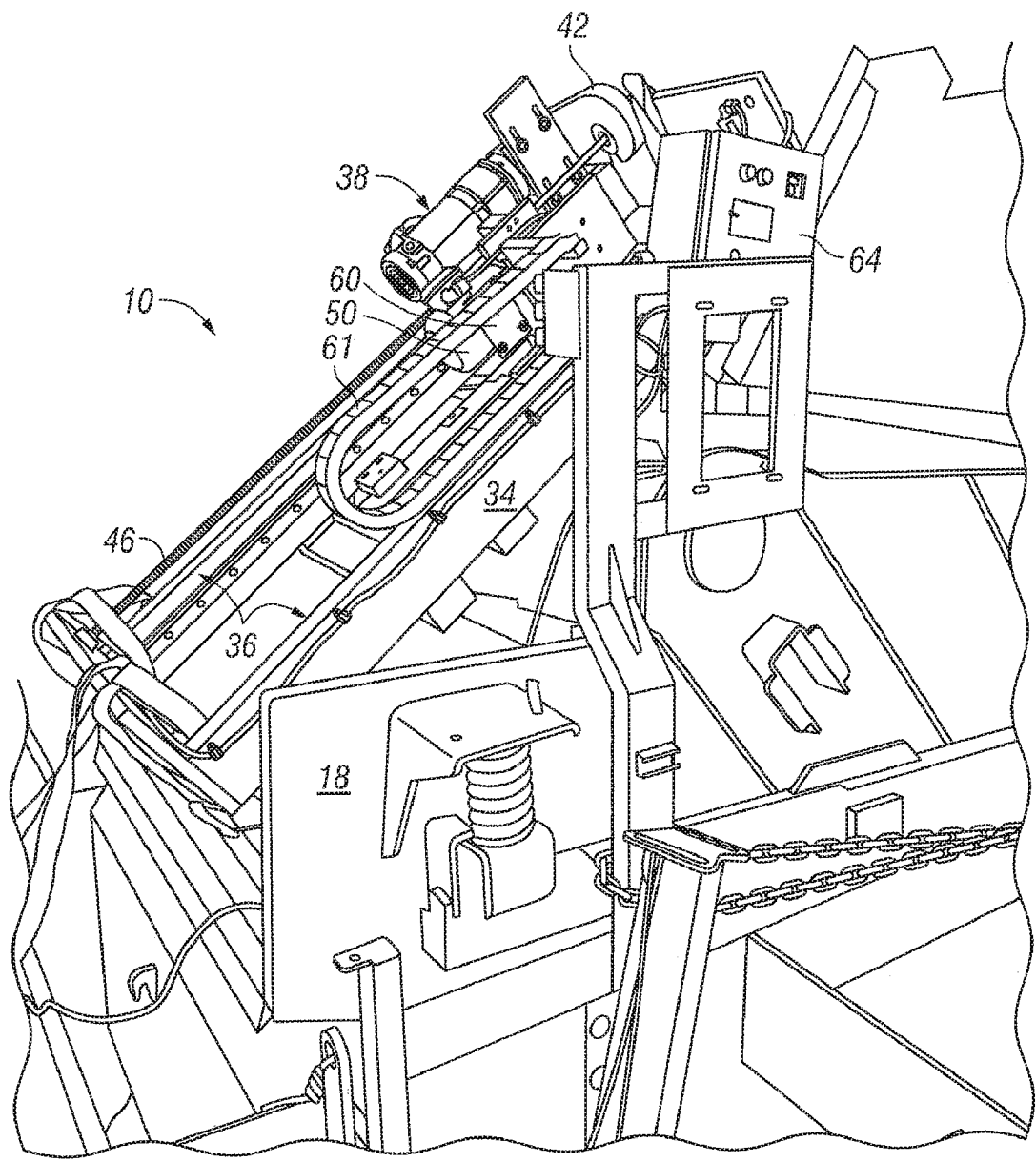
FIG. 4 depicts a side view of a shale shaker motor mounted milling machine positioned and adhered to a shale shaker motor mounting plate wherein the present invention consists of a large frame, spindle carriage, spindle motor, spindle motor gear box and operational travel screw.

The present invention 10 is made to accept a shale shaker motor mounting plate 14 via two adjustably positional mounting brackets (upper mounting bracket 28 and lower mounting bracket 30 at motor mounting plate 14 top and bottom edges, respectively, horizontally, and upper and lower indication blocks 24, 26 vertically, wherein the inferior angular base 14b of the motor mount plate 14 is framed by lower indication blocks 26 and lower mounting bracket 30 and the superior angular edge 14a of the motor mounting plate 14 is framed via reciprocating upper mounting bracket 28 and upper indication blocks 24. The motor mount plate 14 is thereby "framed" on all outer edges of the motor mount plate 14 securing the inward face of the motor plate milling device's smaller, adjustable attachment, positioning and securing "frame" 22 to the outward facing side, top and bottom edges of the motor mounting plate 14. Furthermore, front facing surface is securely fixed by upper and lower indication blocks 24, 26 and the rearward facing surface of the motor mounting plate 14 (as depicted in FIG. 3) is accepting of (and is secured and braced by) inferior mounting brackets 32 whereby motor mounting plate 14 is held in a fixed position via all sides—front, rear and each of four sides (i.e. top bottom and sides). Various and varied sized motor mounting plates can therefore be accommodated by the motor mounting plate milling machine 10 through adjustment of its smaller, adjustable attachment, positioning and adjusting "frame" 22 via adjustment and positioning of both upper and lower mounting brackets 28,30, upper and lower indication blocks 24,26 about the perimeter and frontwardly by upper and lower indication blocks 24,26 and rearwardly by inferior mounting brackets 32 about each side of the motor mounting plate 14 perimeter and motor mounting plate 14 front and back surfaces.

Positioning and adjustment of the adjustable attachment, positioning and securing "frame" 22 not only allows for anchoring of the complete device 10 to the motor mounting plate 14 (as well as adjustment during placement and replacement across disparately-shaped motor mounting surfaces), but also the adjustable attachment, positioning and securing "frame" 22 provides fundamental support to the larger rectangular operational frame 34 and leveling, positioning and guidance to the operationally affective travel screw 46, spindle motor carriage 60, spindle motor 50, and cutting tool 52 wherein even minor deviations in placement, positioning, pitch and depth can result in dramatic aberrations in milling and potentially devastating outcomes in shale shaker operations and safety.

In terms of placement of the device 10, the rectangular operation frame 34 is secured to motor mounting plate 14 by lowering the device 10 onto the edges of the outward facing surface of the motor mounting plate 14 and placing and sliding the mounting blocks 28, 30 above and below the motor mounting plate 14, respectively. Leveling adjustment screws 27 are then utilized to secure, tighten and level the smaller, adjustable attachment, positioning and securing "frame" 22 onto the outer perimeter of the motor mount plate 14. Further, indication blocks 24 and 26 are as well equipped with jack bolts (not shown) that may be used to secure and adjust the device 10 to the motor mount plate 14. Yet it is equally within the contemplation of inventor that the larger operational frame is capable of adjustment. What is more, the smaller, adjustable attachment, positioning and securing "frame" 22 and/or the larger operational frame 34 may be capable of fine or coarse adjustment or both.

The adjustable mounting brackets 28,30 and adjustable indication blocks 24,26 can be moved to different locations, through adjustment and refinement, and positioned to allow the present invention 10 to be mounted onto various and variable-shaped shaker motor mounting plates 14, or like surfaces, amendable to the milling process wherein adjustment screws 27 and depth adjustment of cutting tool 52 (a manual or electronic) depth adjustment knob 56 for refinement of cutting angle and depth.

Operational Frame

The larger rectangular operational frame 34, secured to the adjustable attachment, positioning and securing frame 22 (comprised of indication blocks 24, 26 and upper and lower mounting brackets 28, 30), serves the multi-functions of allowing for securing of the travel motor 38, travel motor gear box 42, the travel screw 46 and advancement of the spindle motor 50, the spindle motor carriage 60 and control box 64, thereto, insuring securing, positioning and attachment of the spindle motor 50 and the spindle motor gear box 42 and fixing of the travel screw 46 for positioning and guidance of the tool bar 51 and cutting tool 52 along the exterior surface of the motor mounting plate 14.

Functionally, the larger rectangular operational frame 34 provides support for the advancement of the tool bar 51 and cutting tool 52, uniformly, along the exterior surface of the motor mounting plate 14. The travel motor 38, via the travel motor gear box 42, induces rotation in either a clockwise or counterclockwise rotation to produce a movement of the spindle motor carriage 64. Attached thereto, the spindle motor 50 operates in a planar, linear fashion and is guided across the exterior surface of the motor milling plate 14 at ever increasing and incremental depths as to allow an integrated cutting tool 52 to come into frictional contact with said motor milling plate 14, the cutting tool 52 exhibiting a cutting element of a sufficient density and sharpness to "mill" or "file" the irregular (worn) exterior surface of the motor milling plate 14 to a desired or predefined level of material removal, removing excess or worn material, resulting in a largely flat and even motor mounting plate 14 surface.

As with the adjustable attachment, positioning and securing "frame" 22, the larger rectangular operational frame 34 is responsible for proper placement and attachment, not to the motor mounting plate 14, but to the adjustable attachment, positioning and securing "frame" 22 for attachment of all fixed operational members (i.e. the travel motor 38, the travel screw 46, the travel motor gear box 42 and control box 64) as well as the mobile members (i.e. spindle motor carriage 60 and the spindle motor 50 exhibiting a tool bar 51 and cutting tool 52). The rectangular operational frame 34 further serves to support both an interior guide track 36 and a cable wire carrier drag chain 61 where the interior guide track 36 allows for fluid movement of the spindle motor carriage 60, within the plane of the rectangular operational frame 34, and the cable wire carrier drag chain 61 works to supply power, via the control box 64 to the spindle motor 50 as well as the travel motor 38.

Operational Element

Operationally, the travel motor 38 and travel motor gear box 42 are designed to maintain a fixed position (via attachment to the rectangular operational frame 34) where both the travel motor gear box 42 and travel motor 38 are in a stationary position. While the travel motor gear box 42 may reside either within and/or above the rectangular operational frame 34, its position is made to reside perpendicular to the (upper) superior edge of the rectangular operational frame 34 with the purpose of rotating a fixed travel screw 46 in either a clockwise or counterclockwise manner providing advancement and retraction of a spindle motor carriage 60 in a predetermined track within the rectangular operational frame 34 harboring the spindle motor 50, the spindle motor gear box 54 and cutting tool 52. The travel screw 46 itself runs parallel (i.e. in the same plane) to both the motor mounting plate 14 and the rectangular operational frame 34 wherein the travel screw 46 is coplanar to both the motor mounting plate 14 and the rectangular operational frame in an area above and beside the surface of the motor mounting plate 14. The travel screw 46 acts to propel the spindle carriage 60, through a predefined track with in the interior of the operational frame 34, whose responsibility it is to both advance the spindle motor carriage 60 and guide the tool bar 51 and cutting tool 52 in the milling process across the exterior surface of the motor mounting plate 14. Cutting tool 52 depth may be controlled by leveling the adjustment screws 27 and/or by a depth adjustment knob 56 that serve to heighten and lower the adjustable attachment, positioning and securing "frame" 22, in the case of leveling adjustment screws 27, and the depth of the cutting tool 52 itself, via adjustment knob 56.

Figure 2:
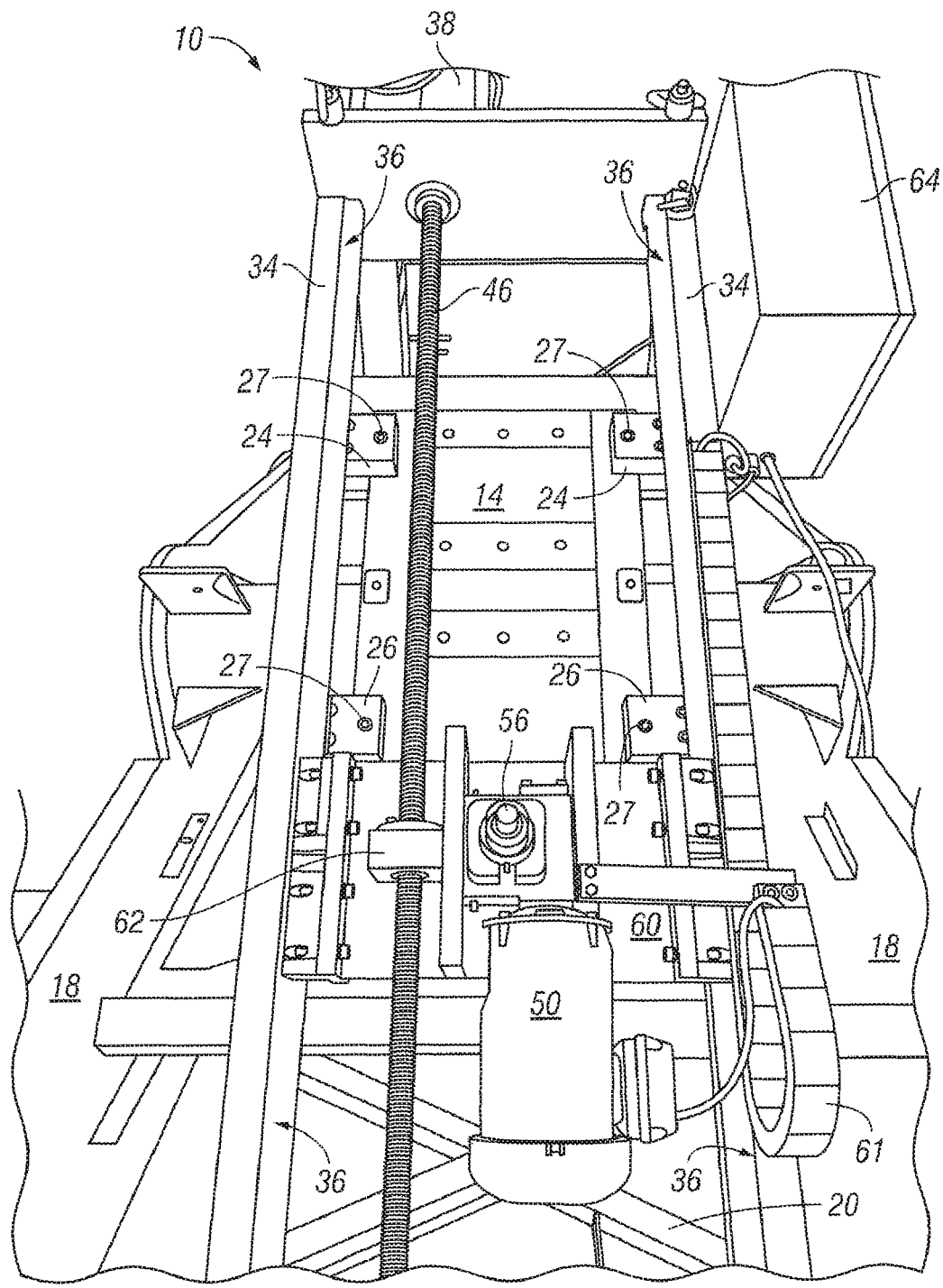
FIG. 2 illustrates a front view of the device in operation with spindle carriage engaged by the travel screw and made to advance across the face of the motor mounting plate to a terminating position.

Whereas the adjustable attachment, positioning and securing frame 22 is modifiable depending on the size of the motor mounting plate 14, the rectangular operational frame 34, travel motor 38, travel motor gear box 42 and travel screw 46 maintain an objectively stationary position with relation to the motor mounting plate 14 and shale shaker 18 after attachment and during operation, the guided spindle motor carriage 60 is movable in the plane of the rectangular operational frame 34, horizontally, and is translocated along the rotational axis of the travel screw 46 through a travel screw 46 accepting and reciprocally threaded spindle motor carriage receiving arm 62 and a threaded bushing. Whereas the spindle motor carriage 60 moves in a predetermined, planer and horizontal path within the rectangular operational frame 34, the cutting tool 52 is operable in a plane perpendicular to the horizontal path of the spindle motor carriage 60 path and rectangular operational frame 34. The tool bar 51 and cutting tool 52 themselves are mounted to the underside of the spindle motor carriage 60 and driven by the spindle motor 50 for "thinly milling" or "shaving" the exterior surface of the motor mounting plate 14 at incrementally increasing depths. As the spindle motor carriage 60 is guided by the rotational travel screw 46 (or other like means such as tracks or guide rails) in a direction parallel to the motor mount plate's 14 exterior surface, the tool bar 51 is utilized as the responsible member for determining cutting depth via the cutting head where cutting depth can be adjusted to increments of $0.001^{th}$ of an inch. The tool bar 51 is turned by the spindle motor 50 and spindle motor gear box 54, milling the exterior surface of the motor mounting plate 14 as it travels along the travel screw 46 (i.e. the spindle motor 50 and spindle motor gear box 54 being connected to the travel screw 46 by an affixed spindle carriage receiving arm 62, the travel screw 46 residing through a threaded bushing within the spindle carriage receiving arm 62 and, as the travel screw 46 is turned, the carriage 60 travels up and down the interior guide track 36 for incremental and uniform cutting). As well, a depth adjustment knob 56 may be employed (as depicted in FIG. 2) to control the depth of the cutting tool as well as operational rotation speed of the cutting tool (in lew of or in addition to regulation by said control box 64).

PREFERRED EMBODIMENTS

In one preferred embodiment, the adjustable attachment, positioning and securing frame may be positionable and adjustable through indication blocks, mounting brackets, inferior mounting brackets or other like means up to and including pins, clasps, wedges, screws. The adjustable attachment, positioning and securing frame may be further modifiable through adjustment of adjustment screws. Moreover, the larger operational frame is capable of height (depth) increases and decreases similar to adjustable attachment, positioning and securing frame (i.e. through integration of adjustment screws).

In another preferred embodiment, the advancement of the spindle motor carriage along a receiving track within the rectangular operational frame may be accomplished through a travel screw and inlaid track or through various other means of locomotion and translocation including manual, mechanical or electronic means of carriage propulsion.

In yet another preferred embodiment, the travel motor may be positioned either above (as in FIG. 2) or beside (in FIG. 1) the rectangular operational frame, as functionalities and ergonomic considerations dictate.

In another embodiment, the smaller adjustable attachment, positioning and securing frame may be responsible for coarse adjustments and the larger operational frame may be responsible for fine adjustments or the smaller adjustable attachment, positioning and securing frame may be responsible for fine adjustments and the larger operational frame may be responsible for coarse adjustments. Yet, it is equally within the contemplation that both the smaller adjustable attachment, positioning and securing frame and the larger operational frame may each be responsible for and have the capability of both fine and coarse adjustments.

In another preferred embodiment, the spindle motor gear box may exhibit a depth adjustment knob for controlling cutting tool depth and/or rotational speed of the cutting tool in lew of or in addition to control box regulation.

A preferred method of attaching a dual frame device (i.e. a motor mounting plate milling device) to the motor mount of a shale shaker, including attaching, positioning and adjusting a smaller adjustable positioning and securing frame to a motor mounting plate of a shale shaker, thus allowing for the attachment of a larger rectangular operational frame for travel motor, travel motor gear box spindle motor, spindle gear box, spindle motor carrier, travel screw, interior track and drag chain placement within and onto the operational frame.

A preferred method of operation wherein the rectangular operational frame, travel motor, travel motor gear box and travel screw maintain an objectively stationary position with relation to the motor mounting plate and shale shaker after attachment and during operation, the guided spindle motor carriage is movable in the plane of the rectangular operational frame, horizontally, which is translocated along the rotational axis of the travel screw through a travel screw accepting and reciprocally threaded spindle motor carriage receiving arm and a threaded bushing. Whereas the spindle motor carriage moves in a predetermined, planer and horizontal path within the rectangular operational frame, the cutting tool is operable in a plane perpendicular to the horizontal path of the spindle motor carriage path and rectangular operational frame. The tool bar and cutting tool themselves are mounted to the underside of the spindle motor carriage and driven by the spindle motor for "thinly milling" or "shaving" the surface of the motor mounting plate at incrementally increasing depths wherein the motor mounting plate face is made true and flat.

Another preferred method of milling of a shale shaker motor mounting plate includes guiding the spindle motor carriage by a rotational travel screw (or other like means such as tracks or guide rails) in a direction parallel to the motor mount plate surface, wherein the tool bar is utilized as the responsible member for determining cutting depth via the cutting head where cutting depth can be adjusted to increments of 0.001th of an inch. The tool bar is turned by the spindle motor gear box, milling the motor mounting plate as it travels along the travel screw (i.e. the spindle motor and spindle motor gear box are connected to the travel screw, the travel screw goes through a threaded bushing within the spindle carriage receiving arm and as the travel screw is turned the carriage travels up and down the track for uniform cutting).

Yet another preferred embodiment wherein the present invention is operated manually through a control box or wirelessly through a portable device (e.g. a portable phone, cellphone, iPhone, tablet computer and the like), or with a stationary device, such as, but not limited to, a desktop or laptop computer. The device (stationary or portable) may be in wired communication with the present invention (e.g. by wire, cable, optic fiber, etc.) or the device can be in wireless communication with the shale shaker milling device. Optionally, the present device may in wired communication with a first device whereby a second device is in wireless communication with the first device and, in one particular aspect, and not by way of limitation, the two devices are portable or stationary devices. It is as well within the contemplation of inventor to have a system that may be operated through a designated mobile application (i.e. "app") downloaded on either a portable or stationary device. It is contemplated by inventor that a combination of wired, wireless, manual and electronic controls, or a combination thereof, can be employed with the present device.

Advantages of the present invention will become readily apparent to those skilled in the art from the following detailed description, wherein there is described in detail certain preferred embodiments of the present invention and examples for illustrative purposes. Although the following detailed description contains many specific features for the purposes of illustration, one of ordinary skill in the art will appreciate that many variations and alterations to the following details are within the scope of the invention (e.g. supplanting chain driven motors with direct drives, reconfiguring mounting devices and orientation, and adjusting the operational orientation of the present invention and the like). Accordingly, the following embodiments of the invention are set forth without any loss of generality to, and without imposing limitations upon, the claimed invention. While embodiments are described in connection with the specification herein, there is no intent to limit the scope to the embodiments disclosed herein. On the contrary, the intent is to cover all alternatives, modifications, and equivalents.

I claim:

1. A mountable, dismountable and adjustable milling device for refurbishing and repairing of a shale shaker motor mounting plate comprising:
    an interior securing and positioning frame, an outer rectangular frame, a travel motor, a travel screw, a spindle carriage and a cutting tool;

said interior securing and positioning frame for securing and positioning said interior securing and positioning frame to a shale shaker motor mounting plate;

said interior securing and positioning frame capable of adjustment about said shale shaker motor mounting plate;

said interior securing and positioning frame comprising upper and lower position blocks, upper and lower mounting brackets, interior mounting brackets, and leveling adjustment screws for adjustable connection to a shale shaker motor mounting plate;

said outer rectangular frame securely affixed superior to said interior securing and positioning frame;

said outer rectangular frame exhibiting an interior track along said outer rectangular frame's interior length;

said travel motor affixed to said rectangular frame and said rotatable travel screw;

said rotatable screw positioned in the interior of, and coplanar with, said rectangular frame;

a travel motor gearbox in communication with said travel motor for induction and maintenance of rotation of said rotatable travel screw;

a spindle carriage movable coplanar with said rectangular frame guided by said interior track;

said spindle carriage exhibiting a spindle carriage motor, a spindle motor gear box, a spindle carriage receiving arm and said cutting tool;

said spindle carriage receiving arm made to receive said rotatable travel screw to guide spindle carriage movement and speed coplanar with said rectangular frame and via said rectangular frame's interior track;

said cutting tool, controllable to varying depths, made to operate at varying depths and varying speeds across said outward face of a shale shaker motor mounting plate; and said spindle carriage operable to move across said outward face of said shale shaker motor mounting plate to allow said cutting tool to mill said outward face of said shale shaker motor mounting plate surface.

2. The mountable, dismountable and adjustable milling device for refurbishing and repairing of an outward face of a shale shaker motor mounting plate of claim 1 wherein said interior securing and positioning frame is secured to said shale shaker motor mounting plate via (1) upper and lower indication blocks and upper and lower mounting brackets, respectively, for upper, lower and side edge adherence and securing, (2) mounting brackets disposed rearwardly for rearward adherence and securing of said interior securing and positioning frame to said shale shaker motor mounting plate, and (3) adjustment screws for securing and positioning frame heightening and lowering in relation to said outward face of said shale shaker motor mounting plate.

3. The mountable, dismountable and adjustable shale shaker motor mounting plate milling device of claim 1 wherein said securing and positioning frame is connected to said motor mounting plate via pins, clasps, wedges, screws.

4. The mountable, dismountable and adjustable shale shaker motor mounting plate milling device of claim 1 wherein movement of said spindle carriage across the outward face of said motor mounting plate is controlled by a travel motor, travel motor gear box and travel screw and whereby depth of milling is controlled by three means: height adjustment of (a) said cutting tool and/or, (b) said securing and positioning frame and/or (c) said outer rectangular operable frame.

5. The mountable, dismountable and adjustable shale shaker motor mounting plate milling device of claim 4 wherein speed and rate of milling may be controlled by (1) the rotational speed of said travel screw, thereby controlling the speed of said spindle carriage, through control of the travel motor and travel motor gear box, and/or (2) adjusting the rotational speed of said cutting tool, through control of the spindle carriage motor and spindle motor gear box.

6. The mountable, dismountable and adjustable shale shaker motor mounting plate milling device of claim 5 wherein the depth of said cutting tool is controlled by a manual tool bar, a depth adjustment knob or both.

7. The placeable, replaceable, movable and removable shale shaker motor mounting plate milling device of claim 2 wherein said interior securing and positioning frame is capable of both fine adjustment and coarse adjustment.

8. The mountable, dismountable and adjustable shale shaker motor plate milling device of claim 1 wherein said rectangular frame is capable of fine adjustment or coarse adjustment.

9. The mountable, dismountable and adjustable shale shaker motor plate milling device of claim 1 wherein operable components controlled manually, electronically, remotely, wired, wirelessly or a combination thereof.

10. A method for milling the outward face of a motor mounting plate of a shale shaker with the mountable, dismountable and adjustable shale shaker motor plate milling device of claim 1 comprising the steps of:

mounting, to the outward face of said motor mounting plate of a shale shaker, the securing and positioning frame adherable to the outward face of a motor mounting plate through indication blocks, mounting brackets, and inferior mounting brackets;

said mounted securing and positioning frame adjustable via adjustment screws for heightening and lowering of said securing and positioning frame in relation to said outward face of a motor mounting plate;

securing to said adjustable securing and positioning frame said rectangular frame for attachment of said control box, said travel motor, said travel motor gear box and said rotationally operable travel screw;

creating, along the length of said rectangular frame and within said rectangular frame's length said interior track;

placing within the operational rectangular frame said moveable spindle carriage, exhibiting said spindle carriage motor, said spindle motor gear box, said spindle carriage receiving arm and said cutting tool beneath said carriage;

ensuring said spindle carriage receiving arm is made to accept said rotationally operable travel screw for movement coplanar to said rectangular frame and along the interior length of said rectangular frame;

rotating said travel screw clockwise and/or counterclockwise via said control box;

advancing and recalling said spindle carrier across the face of said motor mounting plate through clockwise and counterclockwise rotation of said travel screw;

heightening and lowering said cutting tool according to desired depth as to mill the exterior surface of said motor mounting plate; and adjusting the rate and speed of said cutting tool through adjustment of said spindle carriage motor speed.

11. The method of claim 10 wherein securing and positioning frame is connected to the outward face of said motor mounting plate of said shale shaker via said indication blocks, said mounting brackets, said mounting brackets, connected via pins, clasps, wedges, screws, or a combination thereof.

12. The method of claim 10 wherein said rectangular frame is connected to and secured to said securing and positioning frame prior to attachment of said securing and positioning frame to said outward face of said motor mounting plate.

13. The method of claim 10 wherein said spindle carriage traverses the interior length of said rectangular frame coplanar to said rectangular frame and across said outward face of said motor mounting plate, whereas the cutting tool is adjustable to varying depths and speeds and made to run perpendicular to said motor mounting plate for milling.

14. The method of claim 10 wherein said cutting tool runs perpendicular to the outward face of the attached motor mounting plate whereby varying heights and depths, incrementally, causes decreases and increases in milling of said motor mounting plate's outward face's surface.

15. The method of claim 10 wherein the rate of shale shaker motor plate outward face milling is controlled by adjusting the height of (1) said securing and positioning frame (2) of said rectangular operational frame, and/or (3) the speed of travel screw rotation and (4) the speed of cutting tool rotation or a combination thereof.

16. The method of claim 10 wherein the depth of shale shaker motor plate milling is controlled by said adjustment screws on said securing and positioning frame (1) heightening or lowering of said securing and positioning frame in relation to said outward face of said shale shaker motor plate, (2) heightening or lowering of said rectangular frame via attachment of said rectangular frame to said securing and positioning frame and said securing and positioning frame's relation to said outward face of said shale shaker motor plate or (3) by heightening or lowering of said cutting tool via an adjustment knob in relation to said outward face of said shale shaker motor plate or a combination thereof.

17. The method of claim 10 wherein the speed and rotational direction of both the travel motor and spindle motor is controlled through a control box.

18. The method of claim 10 wherein the advancement of the spindle motor carriage along a receiving track within the rectangular operational frame is accomplished through said travel motor's control of rotational direction and speed of said travel screw and movement of said travel carriage via inlaid track.

19. The method of claim 10 wherein the securing and positioning frame is capable of coarse or fine heightening and lowering adjustments in relation to said outer face of said shale shaker motor plate and the outer rectangular frame may be capable of coarse or fine adjustments in relation to said outer face of said shale shaker motor plate via said adjustment screws on said securing and positioning frame.

* * * * *